United States Patent
Ishioka (10) Patent No.: US 11,536,417 B2
(45) Date of Patent: Dec. 27, 2022

(54) BRACKET AND HOLDING STRUCTURE OF ELECTRICAL JUNCTION BOX

(71) Applicant: Yazaki Corporation, Tokyo (JP)

(72) Inventor: Yutaka Ishioka, Makinohara (JP)

(73) Assignee: Yazaki Corporation, Tokyo (JP)

( * ) Notice: Subject to any disclaimer, the term of this patent is extended or adjusted under 35 U.S.C. 154(b) by 322 days.

(21) Appl. No.: 16/905,409

(22) Filed: Jun. 18, 2020

(65) Prior Publication Data

US 2021/0025542 A1 Jan. 28, 2021

(30) Foreign Application Priority Data

Jul. 22, 2019 (JP) .............................. JP2019-134627

(51) Int. Cl.
*H02G 3/08* (2006.01)
*F16M 13/02* (2006.01)

(52) U.S. Cl.
CPC ............ *F16M 13/02* (2013.01); *H02G 3/081* (2013.01)

(58) Field of Classification Search
CPC .......... H02G 3/081; H02G 3/086; H02G 3/14; H02G 3/083; H02G 3/16; H02G 3/08; H02G 3/10; H02G 3/123; H05K 5/0073; F16M 13/02; F16M 11/041; B60R 16/0239; B60R 16/0238; B60R 11/02
See application file for complete search history.

(56) References Cited

U.S. PATENT DOCUMENTS

| 10,103,533 B1 * | 10/2018 | Gretz ..................... H02G 3/26 |
| 2012/0119041 A1 | 5/2012 | Ikehata |
| 2017/0215291 A1 * | 7/2017 | Tsubouchi ........... H01B 7/0045 |

FOREIGN PATENT DOCUMENTS

| JP | 2010-268601 A | | 11/2010 | |
| JP | 2017135770 A | * | 8/2017 | ......... B60R 16/0238 |
| KR | 100860772 B1 | * | 2/2008 | |

OTHER PUBLICATIONS

English Machine Translation of KR 100860772 (Year: 2008).*
English Machine Translation of JP 2017135770 (Year: 2017).*

* cited by examiner

*Primary Examiner* — Roshn K Varghese
(74) *Attorney, Agent, or Firm* — Banner & Witcoff, Ltd.

(57) ABSTRACT

A bracket configured to hold an electrical junction box includes a plate-shaped back surface portion configured to abut on a back surface of the electrical junction box, and a plurality of holding portions which are erected from the back surface portion along an assembly direction of the electrical junction box. The plurality of holding portions are configured to hold at least two positions on side surfaces of the electrical junction box so as to sandwich the electrical junction box in a direction intersecting the side surfaces. The plurality of holding portions are configured to have a first inclination relative to the assembly direction before assembly of the electrical junction box, and have a second inclination which is smaller than the first inclination relative to the assembly direction after the assembly of the electrical junction box.

4 Claims, 6 Drawing Sheets

BRACKET AND HOLDING STRUCTURE OF ELECTRICAL JUNCTION BOX

CROSS REFERENCE TO RELATED APPLICATIONS

This application claims priority from Japanese Patent Application No. 2019-134627 filed on Jul. 22, 2019, the entire contents of which are incorporated herein by reference.

BACKGROUND OF THE INVENTION

Field of the Invention

The present invention relates to a bracket for holding an electrical junction box and a holding structure of an electrical junction box using the bracket.

Description of Related Art

In the related art, for example, a bracket for attaching a vehicle electrical junction box to a vehicle body frame or the like has been proposed. For example, one of the brackets according to the related art includes a structure for holding an electrical junction box over back and side surfaces of the electrical junction box (see, for example, Patent Literature 1).

[Patent Literature 1] JP-A-2010-268601

When an electrical junction box according to the related art is actually used, displacement (i.e., rattle) of the electrical junction box in a bracket may occur due to, for example, vibration accompanying the traveling of a vehicle. In order to prevent such displacement (rattle), the bracket may be configured such that a support piece of the bracket is strongly pressed against the electrical junction box to increase a holding force of the bracket for the electrical junction box. However, in this case, a force required by an operator also increases when the electrical junction box is attached to the bracket, and workability of the attachment work is reduced. In this way, the holding force of the bracket for the electrical junction box had a conflicting relationship with the workability of attaching the electrical junction box to the bracket, as for the bracket according to the related art.

SUMMARY

One or more embodiments provide a bracket capable of achieving both a holding force of a bracket for an electrical junction box and workability of attaching the electrical junction box to the bracket, and a holding structure of an electrical junction box using the bracket.

In an aspect (1), one or more embodiments provide a bracket configured to hold an electrical junction box. The bracket includes a plate-shaped back surface portion configured to abut on a back surface of the electrical junction box, and a plurality of holding portions which are erected from the back surface portion along an assembly direction of the electrical junction box. The plurality of holding portions are configured to hold at least two positions on side surfaces of the electrical junction box so as to sandwich the electrical junction box in a direction intersecting the side surfaces. The plurality of holding portions are configured to have a first inclination relative to the assembly direction before assembly of the electrical junction box, and have a second inclination which is smaller than the first inclination relative to the assembly direction after the assembly of the electrical junction box, or configured to have an elastically changing interval between the holding portions before and after assembly of the electrical junction box.

In an aspect (2), the back surface portion may have a curved shape which protrudes or recesses relative to the back surface of the electrical junction box along the assembly direction.

In an aspect (3), the plurality of holding portions may include two main holding portions disposed to sandwich a position of center of gravity of the electrical junction box, and a sub-holding portion separated from the main holding portions. An angle between a first line segment connecting the two main holding portions and a second line segment connecting the sub-holding portion to the position of center of gravity may be 80 degrees or more and 100 degrees or less.

In an aspect (4), a holding structure of an electrical junction box may include an electrical junction box, and the bracket according to any one of the aspect (1) to (3). A relay piece may be sandwiched between a support piece of the main holding portion integrally connected to the back surface portion and the side surface of the electrical junction box, the relay piece being formed of a material having an elastic modulus smaller than that of the support piece.

According to the aspect (1), the plurality of holding portions for holding the electrical junction box are inclined only by a predetermined angle relative to an assembly direction, and the inclination is reduced from the above state in the process of assembling the bracket and the electrical junction box. For example, before the assembly, when the back surface portion of the bracket has a curved shape so as to protrude relative to the back surface of the electrical junction box, the distance between the holding portions erected from the back surface portion is increased as the bracket approaches the electrical junction box. During the assembly of the electrical junction box to the bracket, when the electrical junction box is moved to approach the back surface portion of the bracket, assembly is easy since the distance between the holding portions is large at an initial stage of the assembling with the holding portions, and the back surface portion abuts on the electrical junction box and deforms so as to be flat when assembly is completed, so that a holding force equivalent to that in the related art can be exhibited. Conversely, for example, when the back surface portion of the bracket has a curved shape so as to be recessed relative to the back surface of the electrical junction box before the assembly, a holding force equivalent to that in the related art can be exhibited since the distance between the holding portions is small, and the back surface portion abuts on the electrical junction box accompanying the progress of the assembly and deforms to be flat, so that the assembly becomes easy. Further, when the holding portions are configured such that the interval between the holding portions elastically changes, during the process of the assembly, by the bracket having an elastic material, the assembly is easy and a holding force equivalent to that in the related art can be exhibited. Thus, the bracket having this configuration can achieve both the holding force of the bracket for the electrical junction box and the workability of attaching the electrical junction box to the bracket.

According to the aspect (2), as described above, when the back surface portion of the bracket has a curved shape so as to protrude or recess relative to the back surface of the electrical junction box along the assembly direction, the inclination of the holding portion changes in the process of assembling the bracket and the electrical junction box. As a result, both the holding force of the bracket for the electrical junction box and the workability of attaching the electrical junction box to the bracket can be more appropriately achieved in comparison with the bracket used for the electrical junction box according to the related art.

According to the aspect (3), the two main holding portions and the sub-holding portion hold the electrical junction box such that the side surfaces of the electrical junction box are surrounded, thereby holding the electrical junction box firmly. In addition, the sub-holding portion can prevent the electrical junction box 2 from being displaced (rattle) in which the electrical junction box rotates around the first line segment connecting the two main holding portions. Therefore, the displacement of the electrical junction box is prevented, and the holding force of the bracket for the electrical junction box is further increased. In other words, the term "80 degrees or more and 100 degrees or less" means approximately 90 degrees.

According to the aspect (4), the main holding portions of the bracket hold the electrical junction box in a state where the relay piece is sandwiched, which is formed of a material having an elastic modulus smaller than a material forming a base member (that is, the back surface portion and the support piece) of the bracket. Therefore, when the electrical junction box is assembled, the adhesion between the main holding portions and the electrical junction box is enhanced by the flexible deformation of the relay piece. Therefore, the displacement (rattle) of the electrical junction box is more appropriately prevented. Wear of the main holding portions and the electrical junction box due to such displacement can also be prevented.

According to one or more embodiments, it is possible to provide a bracket capable of achieving both a holding force of a bracket for an electrical junction box and workability of attaching the electrical junction box to the bracket, and a holding structure of an electrical junction box.

The present invention has been briefly described above. Details of the present invention will become clearer by reading through an embodiment for implementing the present invention to be described below with reference to the accompanying drawings.

DETAILED DESCRIPTION

Hereinafter, a bracket 1 and a holding structure 3 of an electrical junction box 2 using the bracket 1 according to an embodiment of the present invention will be described with reference to the drawings. The bracket 1 is typically a component for attaching the electrical junction box 2 for vehicle control to a vehicle body frame or the like.

Figure 1:
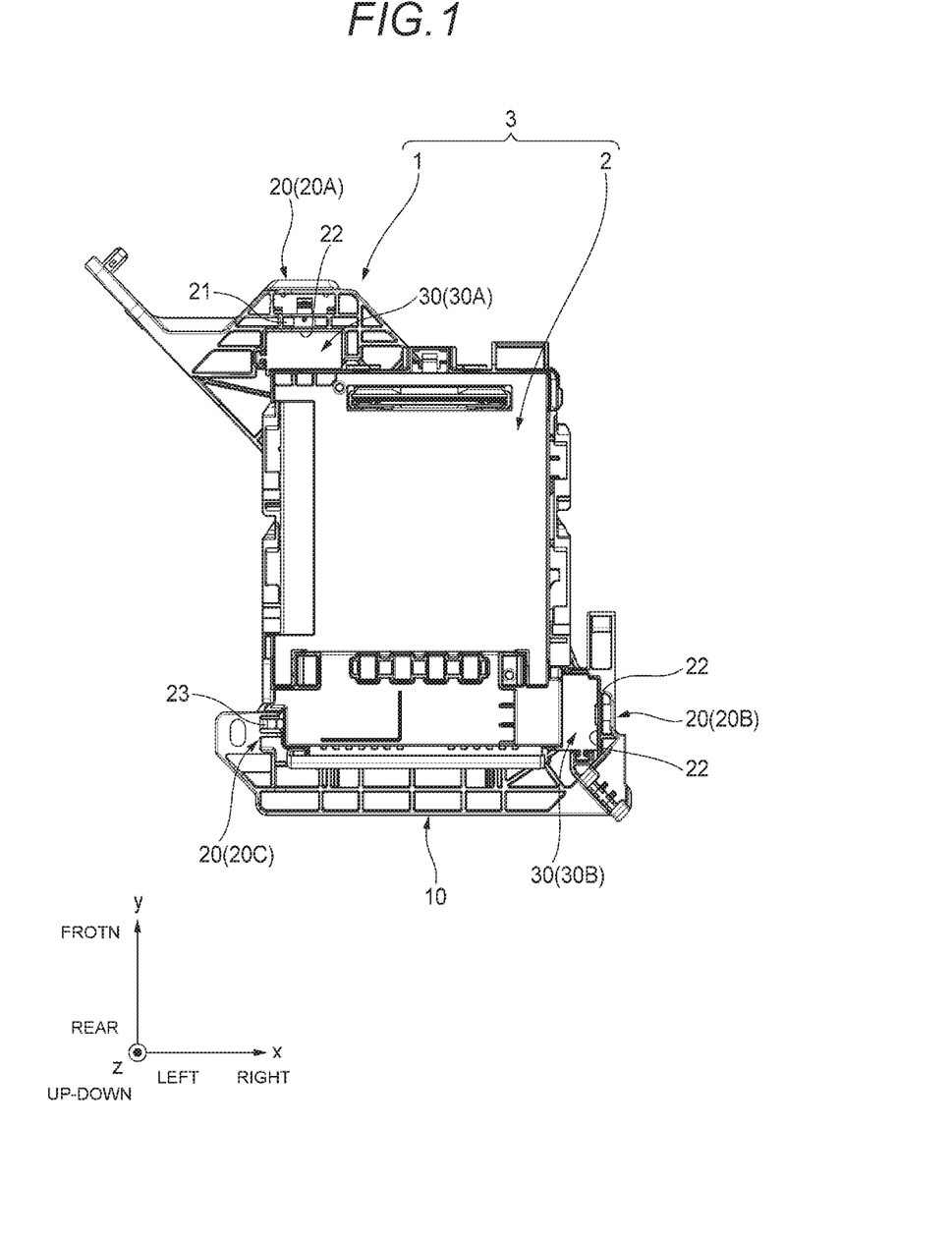
FIG. 1 is a plan view of a holding structure of an electrical junction box according to an embodiment.

As shown in FIGS. 1 to 3B, the holding structure 3 includes the electrical junction box 2 and the resin-formed bracket 1 for holding the electrical junction box 2. Hereinafter, for convenience of description, as shown in FIG. 1, a "left-right direction" (x-axis direction), a "front-rear direction" (y-axis direction), an "up-down direction" (z-axis direction), "left" (x-axis negative direction), "right" (x-axis positive direction), "front" (y-axis positive direction), a "rear" direction (y-axis negative direction), "up" (z-axis positive direction), and "down" (z-axis negative direction) are defined. The up-down direction (z-axis direction) is a direction in which the bracket 1 and the electrical junction box 2 are moved to match each other during assembly of the bracket 1 and the electrical junction box 2, and is also referred to as an "assembly direction". The left-right direction, the front-rear direction, and the up-down direction are perpendicular to one another. Hereinafter, each component constituting the holding structure 3 will be described in order.

Figure 3A:
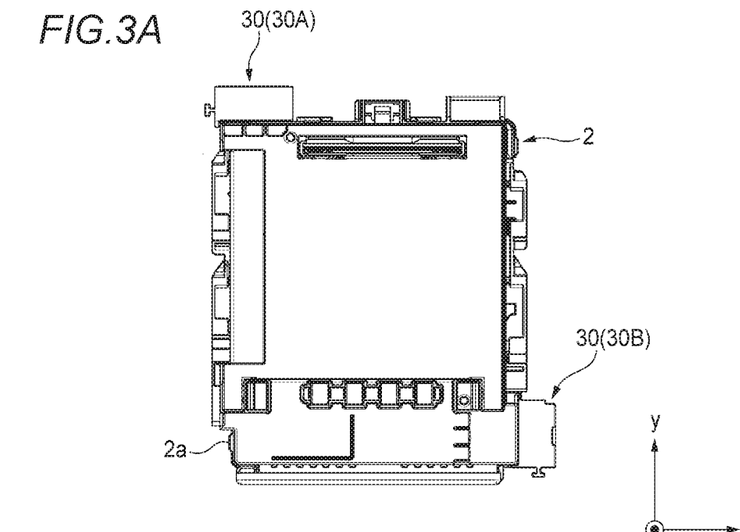
FIG. 3A is a plan view of the electrical junction box illustrated in FIG. 1.

First, the electrical junction box 2 will be described. As shown in FIG. 3A, the electrical junction box 2 includes a resin-formed housing having a substantially rectangular parallelepiped shape including an upper surface, a back surface (lower surface), and four side surfaces. A plurality of electronic components (not illustrated) for controlling a vehicle are built in the electrical junction box 2. A locking protrusion 2a protruding leftward is provided at a rear end portion of a left surface (a surface facing the left) among the four side surfaces of the electrical junction box 2. The locking protrusion 2a engages with a locking protrusion 23a (described below) of a sub-holding portion 20C (described below) of the bracket 1.

Relay pieces 30 (30A, 30B) having a substantially rectangular parallelepiped shape are attached to two positions on side surfaces of the electrical junction box 2, respectively. In this embodiment, the relay piece 30A is attached to a left end portion of a front surface (surface facing the front) among the four side surfaces of the electrical junction box 2 such that the relay piece 30A protrudes forward, and the relay piece 30B is attached to a rear end portion of a right surface (surface facing the right) among the four side surfaces of the electrical junction box 2 such that the relay piece 30B protrudes rightward. The relay piece 30 is fixed to a side surface of the electrical junction box 2 so as not to move relative to the side surface, by a predetermined engagement structure including an engagement between a locking protrusion 31 (see FIG. 5B) provided on the relay piece 30 and a locking protrusion 2b (see FIG. 5B) provided on a side surface of the electrical junction box 2.

The relay pieces 30 are formed of a material (typically, a resin material) having an elastic modulus smaller than that of a resin material forming a base member of the bracket 1. In this embodiment, the relay pieces 30A, 30B have the same shape. The operation and effects obtained by providing the relay pieces 30 will be described below.

Figure 3B:
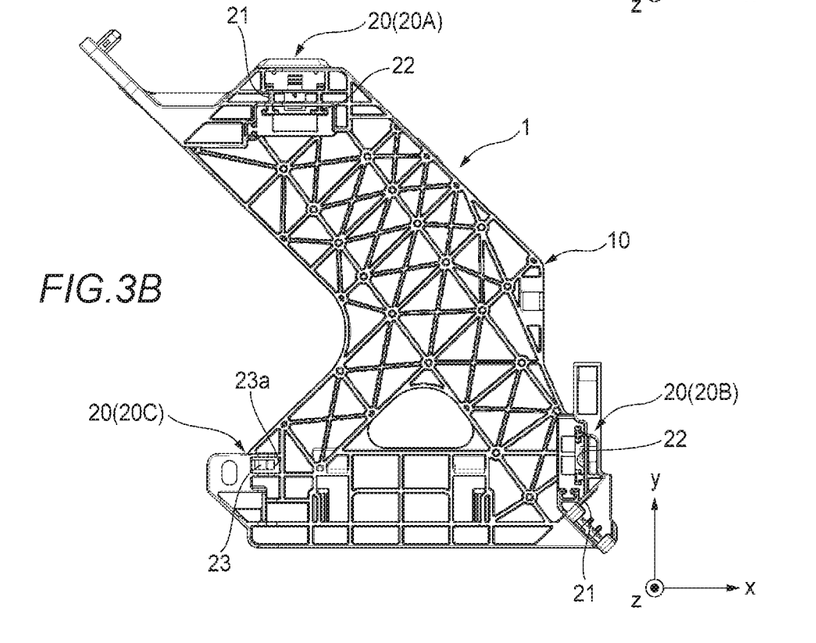
FIG. 3B is a plan view of a bracket illustrated in FIG. 1.

Next, the bracket 1 will be described. The bracket 1 is a resin molded article. As shown in FIG. 3B, the bracket 1 includes a substantially flat back surface portion 10, and a plurality of holding portions 20 (main holding portions 20A, 20B, and the sub-holding portion 20C to be described below) erected upward from the back surface portion 10. The back surface portion 10 is a portion that abuts on the back surface of the electrical junction box 2, and the holding portions 20 are a portion that holds a peripheral edge of a side surface of the electrical junction box 2.

In this embodiment, the main holding portions 20A, 20B provided at positions corresponding to the relay pieces 30A, 30B attached to the electrical junction box 2 and the sub-holding portion 20C provided at a position corresponding to the locking protrusion 2a (see FIG. 3A) of the electrical junction box 2 are provided as the plurality of holding portions 20. The sub-holding portion 20C is separated from the main holding portion 20A, 20B.

Figure 5A:
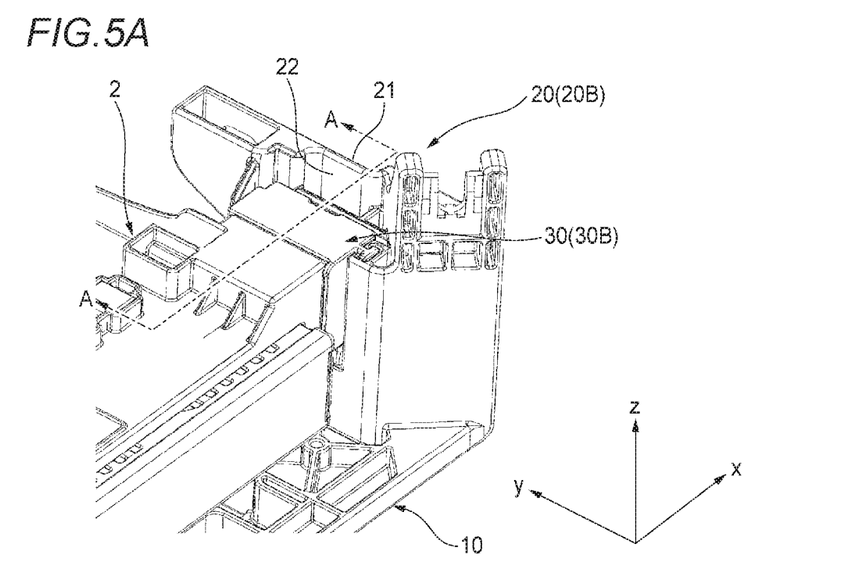
FIG. 5A is an enlarged perspective view of one main holding portion of the holding structure illustrated in FIG. 1.

As shown in FIGS. 3B and 5A, each of the main holding portions 20A, 20B includes a support piece 21 integrally connected from the back surface portion 10 and erected upward. A recess 22 for accommodating and holding the relay piece 30 attached to the electrical junction box 2 is formed on a surface of the support piece 21 facing the side surface of the electrical junction box 2.

Specifically, the recess 22 of the main holding portion 20A is formed in a rear surface (surface facing the rear) of the support piece 21 of the main holding portion 20A and is a substantially rectangular parallelepiped shaped depression for accommodating the relay piece 30A having a substantially rectangular parallelepiped shape. The recess 22 is depressed forward, extends in the up-down direction (assembly direction), and opens rearward and upward. The recess 22 of the main holding portion 20B is formed in a left surface (surface facing the left) of the support piece 21 of the main holding portion 20B and is a substantially rectangular parallelepiped shaped depression for accommodating the relay piece 30B having a substantially rectangular parallelepiped shape. The recess 22 is depressed rightward, extends in the up-down direction (assembly direction), and opens leftward and upward.

As shown in FIG. 3B, the sub-holding portion 20C includes a support piece 23 integrally connected from the back surface portion 10 and erected upward. The locking protrusion 23a, which engages with the locking protrusion 2a of the electrical junction box 2 to hold a peripheral edge of a side surface of the electrical junction box 2, is provided at a right surface (surface facing the right) of the support piece 23 such that the locking protrusion 23a protrudes rightward.

Figure 2:
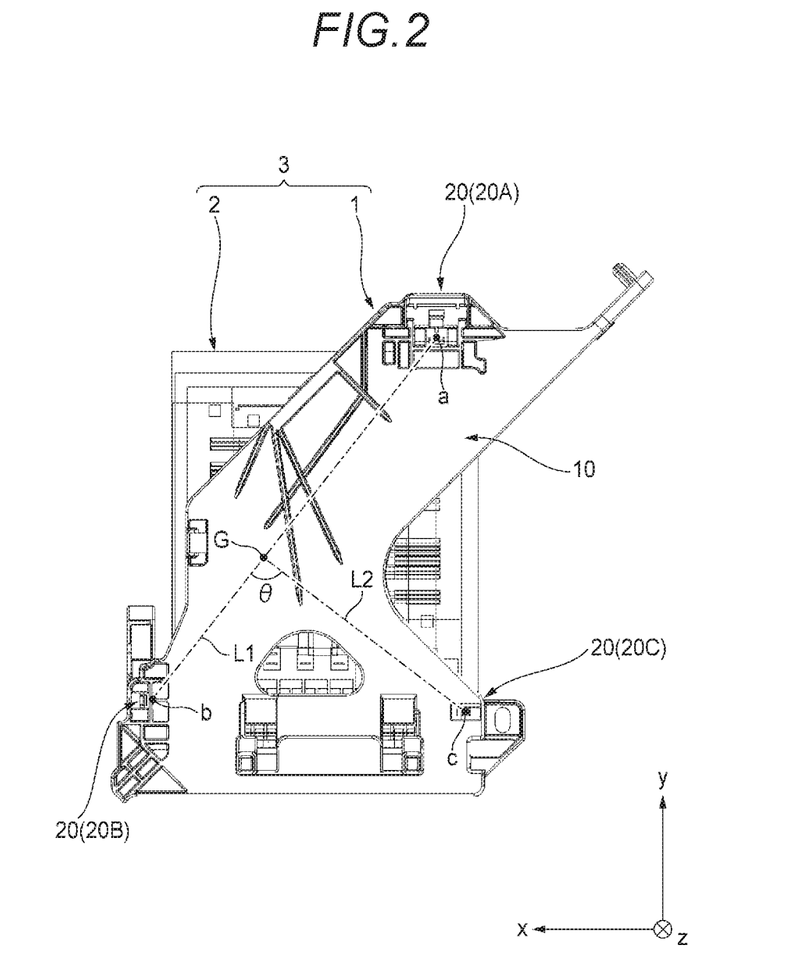
FIG. 2 is a back view of the holding structure illustrated in FIG. 1.

As shown in FIG. 2, an angle θ between a first line segment L1 connecting a center point a of the main holding portion 20A to a center point b of the main holding portion 20B and a second line segment L2 connecting a center point c of the sub-holding portion 20C to a center of gravity G of the electrical junction box 2 is approximately 90 degrees. Further, in this embodiment, the center of gravity G is located on the first line segment L1. In this embodiment, the center point a (b) of the main holding portion 20A (20B) refers to a center position of inner space of the recess 22, and the center point c of the sub-holding portion 20C refers to an engagement position between the locking protrusion 2a of the electrical junction box 2 and the locking protrusion 23a of the sub-holding portion 20C. The term "approximately 90 degrees" in the present embodiment may be expressed as 80 degrees or more and 100 degrees or less.

Figure 4:
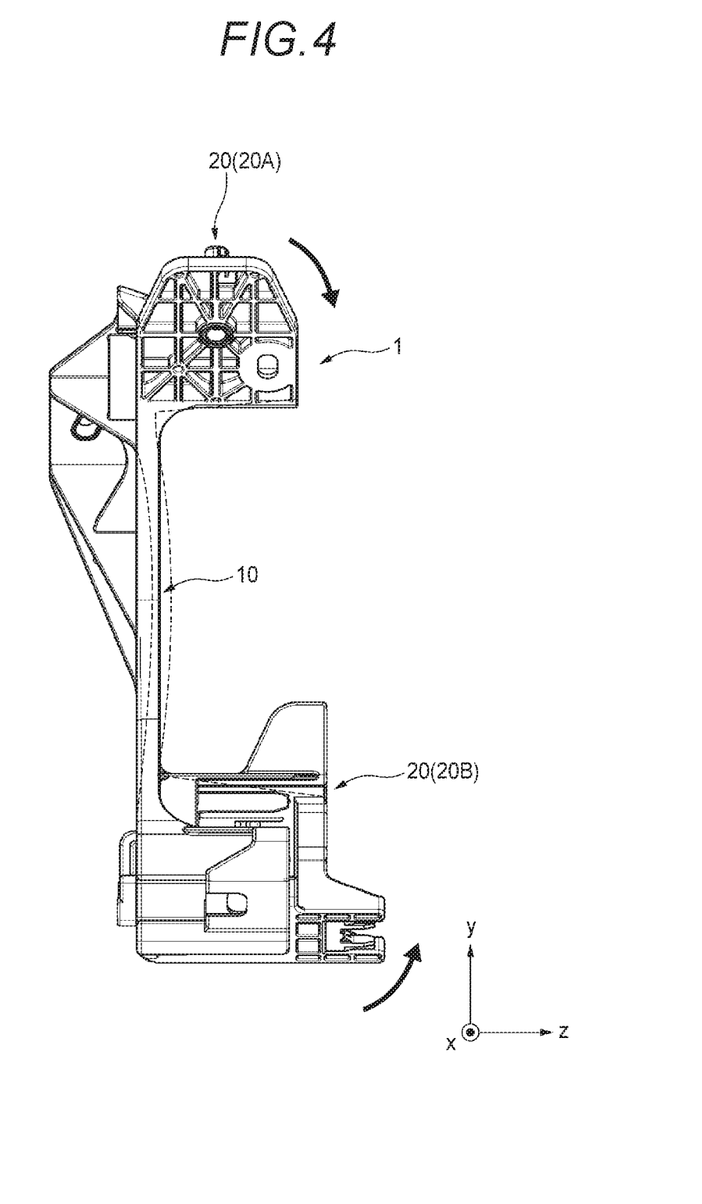
FIG. 4 is a left side view of the bracket.

As indicated by a broken line in FIG. 4, in a state of the single bracket 1 (a state before the bracket 1 is attached to the electrical junction box 2), the back surface portion 10 of the bracket 1 is curved such that a central portion of the back surface portion 10 protrudes upward than a peripheral portion located around the central portion. In other words, the back surface portion 10 is curved so as to protrude toward the back surface of the electrical junction box 2.

Due to the curved back surface portion 10 as described above, each of the main holding portions 20A, 20B is tilted so as to be slightly inclined outward. Specifically, the main holding portion 20A is tilted so as to be slightly inclined forward, and the main holding portion 20B is tilted so as to be slightly inclined rightward. As a result, the distance between the main holding portion 20A and the main holding portion 20B gradually increases with going upward. Hereinafter, each component constituting the holding structure 3 will be described.

Next, a procedure of attaching the electrical junction box 2 to the bracket 1 will be described. First, as shown in FIG. 3A, the relay pieces 30 (30A, 30B) are attached to side surfaces of the electrical junction box 2, respectively. Next, the electrical junction box 2 is placed above the bracket 1, and the electrical junction box 2 is moved close to the back surface portion 10 of the bracket 1 along the up-down direction (assembly direction) such that the relay piece 30A is inserted into the recess 22 of the main holding portion 20A, the relay piece 30B is inserted into the recess 22 of the main holding portion 20B, and the right surface of the support piece 23 of the sub-holding portion 20C is brought into face-to-face contact (sliding) with the side surface around locking protrusion 2a of the electrical junction box 2.

At a stage before the back surface of the electrical junction box 2 abuts on the back surface portion 10 of the bracket 1, as described above, the back surface portion 10 of the bracket 1 is curved, so that each of the main holding portions 20A, 20B is tilted so as to be slightly inclined outward, and an interval between the main holding portion 20A and the main holding portion 20B is widened. Therefore, when work of moving the electrical junction box 2 close to the back surface portion 10 of the bracket 1 is performed, the main holding portions 20A, 20B are less likely to interfere with each other, so that the work is facilitated.

When the back surface of the electrical junction box 2 abuts on the back surface portion 10 of the bracket 1, the back surface of the electrical junction box 2 is then pressed against the back surface portion 10 of the bracket 1. As a result, the curved back surface portion 10 is elastically deformed so as to be flat. In conjunction with the elastic deformation of the back surface portion 10, each of the main holding portions 20A, 20B rises in a direction in which the outward inclination disappears (see thick arrows in FIG. 4). Specifically, the main holding portion 20A rises so as to move rearward, and the main holding portion 20B rises so as to move leftward. That is, each of the main holding portions 20A, 20B rises so as to approach the side surface of the electrical junction box 2.

As a result, in a state where the back surface portion 10 of the bracket 1 is flat (see the thick arrows in FIG. 4), the main holding portion 20A presses the side surface (front surface) of the electrical junction box 2 rearward via the relay piece 30A accommodated in the recess 22 of the main holding portion 20A, and the main holding portion 20B presses the side surface (right surface) leftward via the relay piece 30B accommodated in the recess 22 of the main holding portion 20B.

Figure 5B:
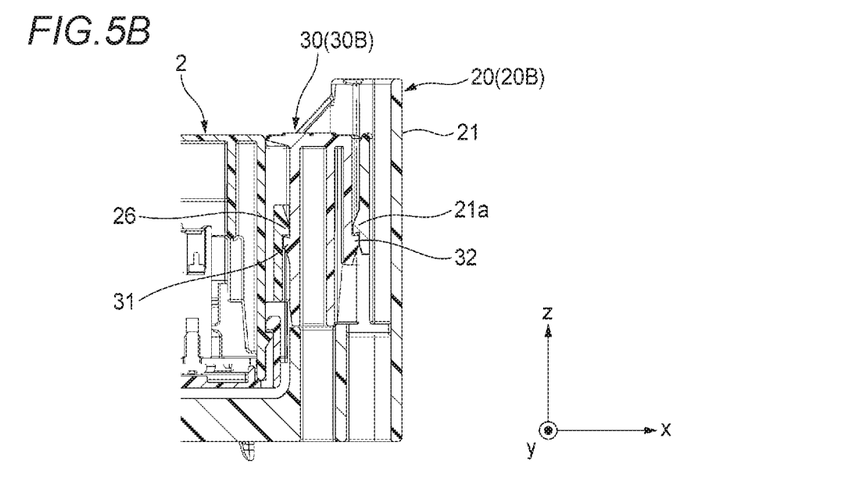
FIG. 5B is a cross-sectional view taken along a line A-A of FIG. 5A.

Further, in this state, as shown in FIG. 5B, the locking protrusion 32 provided on the relay piece 30 engages with the locking protrusion 21a provided on the support piece 21 of the main holding portion 20 (20A, 20B), and the locking protrusion 2a of the electrical junction box 2 engages with the locking protrusion 23a of the sub-holding portion 20C. As a result, the electrical junction box 2 is held at three positions on the periphery of side surfaces of the electrical junction box 2 by three main holding portions 20 (two main holding portions 20A, 20B, and one sub-holding portion 20C) of the bracket 1, and is sandwiched in a direction perpendicular to the side surface of the electrical junction box 2, so that the electrical junction box 2 is prevented from falling off from the bracket 1. As described above, the attachment of the electrical junction box 2 to the bracket 1 is completed.

A force, which is generated by pressing the side surface (front surface) of the electrical junction box 2 rearward by the main holding portion 20A via the relay piece 30A, is transmitted to an inner wall surface (specifically, a surface facing the front) of the recess 22 of the main holding portion 20B via the electrical junction box 2 and the relay piece 30B fixed to the electrical junction box 2, and is received by the inner wall surface. A force, which is generated by pressing the side surface (right surface) of the electrical junction box 2 leftward by the main holding portion 20B via the relay piece 30B, is transmitted to a right surface of the support piece 23 of the sub-holding portion 20C via the electrical junction box 2, and is received by the right surface. As a result, the electrical junction box 2 can be reliably held so as not to move relative to the bracket 1.

As described above, according to the bracket 1 of the embodiment of the present invention, the back surface portion 10 of the bracket 1 has a curved shape so as to protrude toward the back surface of the electrical junction box 2. In other words, the distance between the plurality of holding portions 20 erected from the back surface portion 10 is increased as the bracket 1 approaches the electrical junction box 2. Therefore, when the electrical junction box 2 is moved to approach the back surface portion 10 of the bracket 1, assembly is easy since the distance between the holding portions 20 is large at an initial stage of assembling with the holding portions 20, and the back surface portion 10 abuts on the electrical junction box 2 and deforms so as to be flat when assembly is completed, so that a holding force equivalent to that in the related art can be exhibited. Therefore, both the holding force of the bracket 1 for the electrical junction box 2 and the workability of attaching the electrical junction box 2 to the bracket 1 can be achieved.

Further, according to the bracket 1 of the embodiment of the present invention, the two main holding portions 20A, 20B and the sub-holding portion 20C hold the electrical junction box 2 such that the peripheral edges of the side surfaces of the electrical junction box 2 are surrounded, thereby holding the electrical junction box 2 more firmly. In addition, the sub-holding portion 20C can prevent the electrical junction box 2 from being displaced (so-called rattle) such that the electrical junction box 2 rotates around the first line segment L1 connecting the two main holding portions 20A, 20B. Therefore, the displacement (rattle) of the electrical junction box 2 is prevented, and the holding force of the bracket 1 for the electrical junction box 2 is further increased.

According to the holding structure 3 of the electrical junction box of the embodiment of the present invention, the electrical junction box 2 is held by the main holding portions 20A, 20B of the bracket 1 with the relay piece 30 sandwiched, which is formed of a material having an elastic modulus smaller than a material forming a base member (that is, the back surface portion 10 and the support piece 21) of the bracket 1. Therefore, when the electrical junction box 2 is assembled, the adhesion between the main holding portions 20A, 20B and the electrical junction box 2 is enhanced by flexible deformation of the relay piece 30. Therefore, the displacement (rattle) of the electrical junction box 2 is further prevented. Wear of the main holding portions 20A, 20B and the electrical junction box 2 due to such displacement can be prevented.

The present invention is not limited to the above embodiment and various modifications can be adopted within the scope of the present invention. For example, the present invention may be appropriately modified, improved or the like. In addition, materials, shapes, dimensions, numerals, disposition positions or the like of constituent elements in the above embodiment are optional and not limited as long as the object of the present invention can be achieved.

In the above embodiment, the relay piece 30 is sandwiched between the support piece 21 of the main holding portion 20 and the side surface of the electrical junction box 2. In contrast, the relay piece 30 may not be sandwiched. In this case, it is preferable that a protruding portion having a shape identical to the shape of the relay piece 30 is provided on a side surface of the housing of the electrical junction box 2 integrally with the relay piece 30.

Further, in the above embodiment, the center of gravity G of the electrical junction box 2 is located on the first line segment L1 (see FIG. 2). In contrast, the center of gravity G of the electrical junction box 2 may not be located on the first line segment L1 as long as the angle θ between the first line segment L1 and the second line segment L2 is approximately 90 degrees (that is, 80 degrees or more and 100 degrees or less).

Further, in the above embodiment, the back surface portion 10 of the bracket 1 has a curved shape so as to protrude toward the back surface of the electrical junction box 2, so that both the holding force of the bracket 1 for the electrical junction box 2 and the workability of attaching the electrical junction box 2 to the bracket 1 are achieved (see FIG. 4). In contrast, as indicated by a broken line in FIG. 6, in a state of the single bracket 1 (a state before the bracket 1 is attached to the electrical junction box 2), the back surface portion 10 of the bracket 1 may be curved such that a central portion of the back surface portion 10 protrudes downward than a peripheral portion located around the central portion. In other words, the back surface portion 10 may be curved so as to be recessed toward the back surface of the electrical junction box 2.

Figure 6:
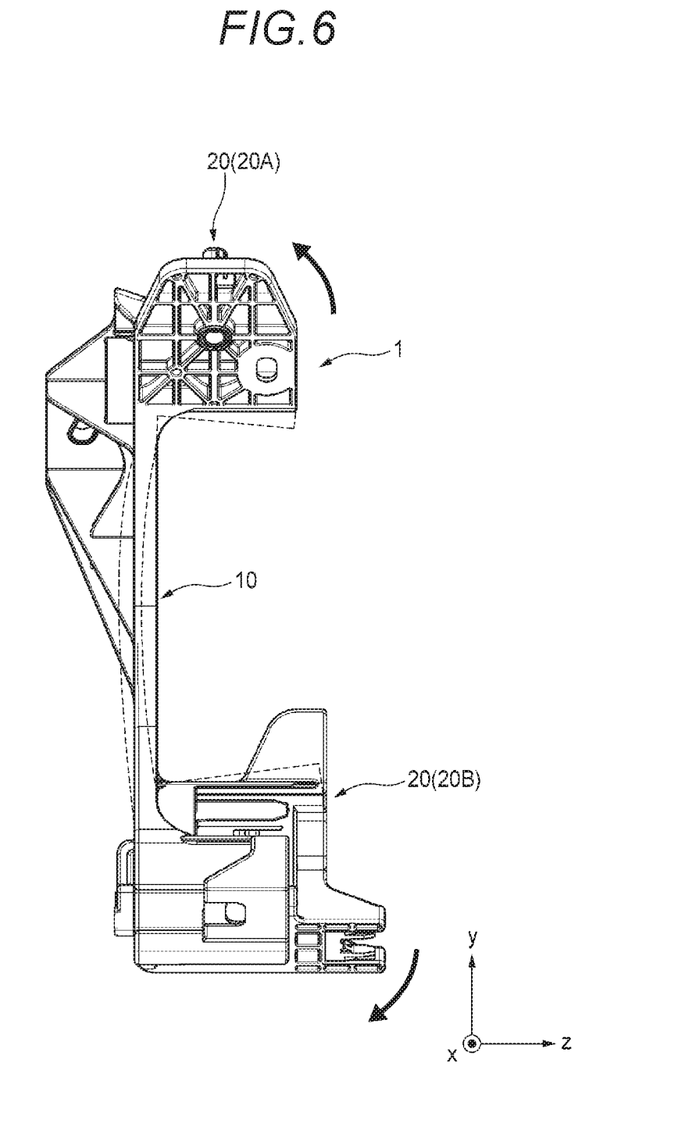
FIG. 6 is a left side view of a bracket according to another embodiment.

As shown in FIG. 6, the back surface portion 10 is curved in a recessed shape, so that each of the main holding portions 20A, 20B is tilted so as to be slightly inclined inward. In this case, since the interval between the main holding portions 20A, 20B is narrowed at the initial stage of assembling the bracket 1 and the electrical junction box 2, the work of moving the electrical junction box 2 close to the back surface portion 10 of the bracket 1 is slightly more difficult than the above embodiment (see FIG. 4). However, with the progress of the assembly, the back surface portion 10 abuts on the electrical junction box 2 and deforms to be flat, so that each of the main holding portions 20A, 20B rises in a direction in which the inclination to the inner side disappears. Therefore, the assembly work is gradually facilitated.

In a state where the back surface portion 10 of the bracket 1 is flat (see a solid line in FIG. 6), the main holding portion 20A presses the side surface (front surface) of the electrical junction box 2 inward via the relay piece 30A (see FIG. 1), and the main holding portion 20B presses the side surface (right surface) of the electrical junction box 2 inward via the relay piece 30B. As a result, the electrical junction box 2 is appropriately prevented from falling off from the bracket 1.

As another example, the bracket 1 may be configured such that the back surface portion 10 of the bracket 1 is flat, and the main holding portions 20A, 20B, and the sub-holding portion 20C are inclined and erected from the back surface portion 10. According to this configuration, similarly to the examples shown in FIGS. 4 and 6, the main holding portions 20A, 20B deform in a direction in which the inclination of each of the main holding portions 20A, 20B disappears, so that the assembly becomes easy, and the electrical junction box 2 is appropriately prevented from falling off from the bracket 1.

As still another example, an elastic deformation mechanism (such as a spring) may be incorporated into the back surface portion 10 of the bracket 1 such that the distance between the main holding portions 20A, 20B or the distance between the main holding portion 20A, 20B and the sub-holding portion 20C are variable in the front-rear direction and the left-right direction.

Here, features of the embodiments of the bracket 1 and the holding structure 3 according to the present invention will be briefly summarized in the following [1] to [4].

[1] A bracket (1) configured to hold an electrical junction box (2), the bracket (1) comprising:
a plate-shaped back surface portion (10) configured to abut on a back surface of the electrical junction box (2); and
a plurality of holding portions (20) which are erected from the back surface portion (10) along an assembly direction of the electrical junction box (2) (Z-axis direction),
wherein the plurality of holding portions (20) are configured to hold at least two positions on side surfaces of the electrical junction box (2) so as to sandwich the electrical junction box (2) in a direction intersecting the side surfaces, and
wherein the plurality of holding portions (20) are configured to have a first inclination relative to the assembly direction before assembly of the electrical junction box (2), and have a second inclination which is smaller than the first inclination relative to the assembly direction after the assembly of the electrical junction box (2) (see FIGS. 4 and 6), or configured to have an elastically changing interval between the holding portions (20) before and after assembly of the electrical junction box (2).

[2] The bracket (1) according to the above [1],
wherein the back surface portion (10) has a curved shape which protrudes or recesses relative to the back surface of the electrical junction box (2) along the assembly direction.

[3] The bracket (1) according to the above [1] or [2],
wherein the plurality of holding portions (20) comprises:
two main holding portions (20A, 20B) disposed to sandwich a position of center of gravity (G) of the electrical junction box (2); and
a sub-holding portion (20C) separated from the main holding portions (20A, 20B), and
wherein an angle (θ) between a first line segment (L1) connecting the two main holding portions (20A, 20B) and a second line segment (L2) connecting the sub-holding portion (20C) to the position of center of gravity (G) is 80 degrees or more and 100 degrees or less.

[4] A holding structure (3) of an electrical junction box comprising:
an electrical junction box (2); and
the bracket (1) according to any one of the above [1] to [3],
wherein a relay piece (30) is sandwiched between a support piece (21) of the main holding portion (20A, 20B) integrally connected to the back surface portion (10) and the side surface of the electrical junction box (2), the relay piece (30) being formed of a material having an elastic modulus smaller than that of the support piece (21).

What is claimed is:

1. A bracket configured to hold an electrical junction box, the bracket comprising:
    a plate-shaped back surface portion configured to abut on a back surface of the electrical junction box; and
    a plurality of holding portions which are erected from the back surface portion along an assembly direction of the electrical junction box,
    wherein the plurality of holding portions are configured to hold at least two positions on side surfaces of the electrical junction box so as to sandwich the electrical junction box in a direction intersecting the side surfaces,
    wherein the back surface portion has a curved shape extending from a first holding portion of the plurality of holding portions to a second holding portion of the plurality of holding portions, wherein the back surface portion with the curved shape is configured to change in curvature relative to the back surface of the electrical junction box along the assembly direction,
    wherein the plurality of holding portions are configured to have a first inclination relative to the assembly direction before assembly of the electrical junction box, and have a second inclination which is smaller than the first inclination relative to the assembly direction after the assembly of the electrical junction box,
    wherein the plurality of holding portions comprises:
        two main holding portions disposed to sandwich a position of center of gravity of the electrical junction box; and
        a sub-holding portion separated from the main holding portions, and
    wherein one of angles between a first line segment connecting the two main holding portions and a second line segment connecting the sub-holding portion to the position of center of gravity is 80 degrees or more and 100 degrees or less.

2. The bracket according to claim 1,
wherein the plurality of holding portions switch from the first inclination to the second inclination based on a change in the curved shape of the back surface portion.

3. The bracket according to claim 1,
wherein the bracket has an elastic material.

4. A holding structure of an electrical junction box comprising:
    an electrical junction box; and
    the bracket according to claim 1,
    wherein a relay piece is sandwiched between a support piece of the main holding portion integrally connected to the back surface portion and the side surface of the electrical junction box, the relay piece being formed of a material having an elastic modulus smaller than that of the support piece.

* * * * *